June 21, 1927.

J. W. MOWBRAY 1,632,911

LINE CONTROL TRACTOR

Filed Sept. 13. 1918

Inventor
JAMES W. MOWBRAY

Witness
William Leston

By
Charles E. Wiser
Attorney

June 21, 1927.

J. W. MOWBRAY 1,632,911

LINE CONTROL TRACTOR

Filed Sept. 13, 1918

Witness
William Seatok

Inventor
James W. Mowbray

By
Charles E. Wiener
Attorney

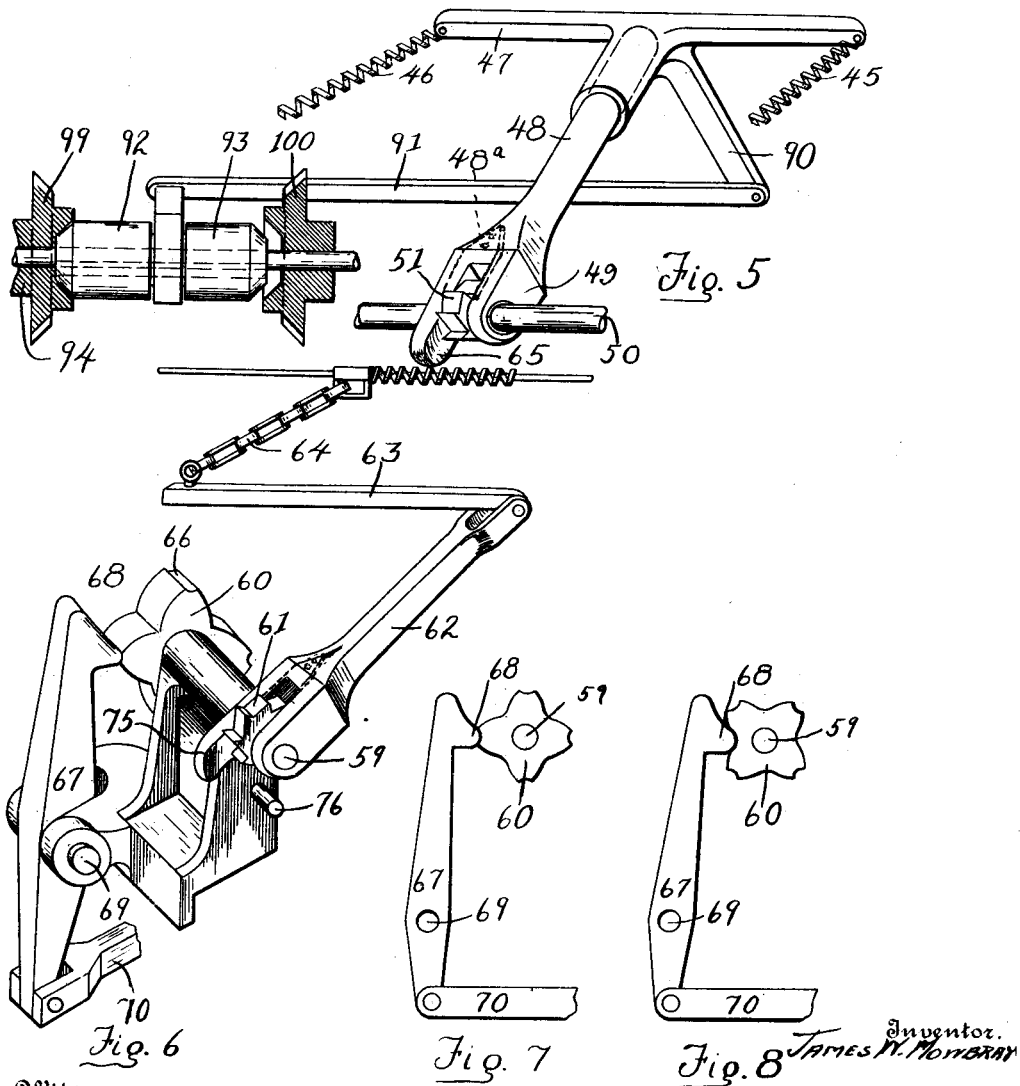

Patented June 21, 1927.

1,632,911

UNITED STATES PATENT OFFICE.

JAMES W. MOWBRAY, OF WINDSOR, ONTARIO, CANADA, ASSIGNOR, BY MESNE ASSIGNMENTS, TO THE AUTOMOTIVE CORPORATION, OF FORT WAYNE, INDIANA, A CORPORATION OF DELAWARE.

LINE CONTROL TRACTOR.

Application filed September 13, 1918. Serial No. 253,857.

This invention relates to tractors, and its object is to provide a simple and efficient tractor of two-wheeled type adapted to operate as a draft apparatus in the drawing of loads or other vehicles, or for drawing apparatus of various types as, for instance, plows or other farm devices. The primary object of the invention is to provide a means for controlling the operation of the tractor from a distance as for instance by an operator on the load or device drawn thereby. In the usual tractor the operator is positioned on the apparatus and provided with the various foot and hand levers for controlling the speed of operation of the device or its direction of movement, etc. In the device herein disclosed, all the devices on the tractor to be controlled, for instance the throttle, speed of operation of the engine, or speed of movement of the vehicle through control of the power transmission apparatus and its direction of movement are operated solely by a pair of lines through and by means of which the tractor may be made to advance or back up, to operate at various engine speeds, and various speeds of travel and is guided in its movement at the will of the operator.

Various features of the invention are involved in the means employed whereby the pair of lines may be depended upon to control the device in the manner stated. Further objects of the invention are involved in the means employed in steering the tractor, and these and other various novel features of the invention and the construction of the various controlled parts are hereinafter more fully described and claimed and shown in the accompanying drawings in which—

Fig. 5 is a detail of the means employed in guiding the machine.

Fig. 6 is a detail of one of the controlled parts used in shifting the gears and transmission case.

Fig. 7 is an elevation of the lever for controlling the sliding gear of the transmission when set in operative position.

Fig. 8 is a similar detail showing the lever set to throw the gear into inoperative position.

Figure 1:
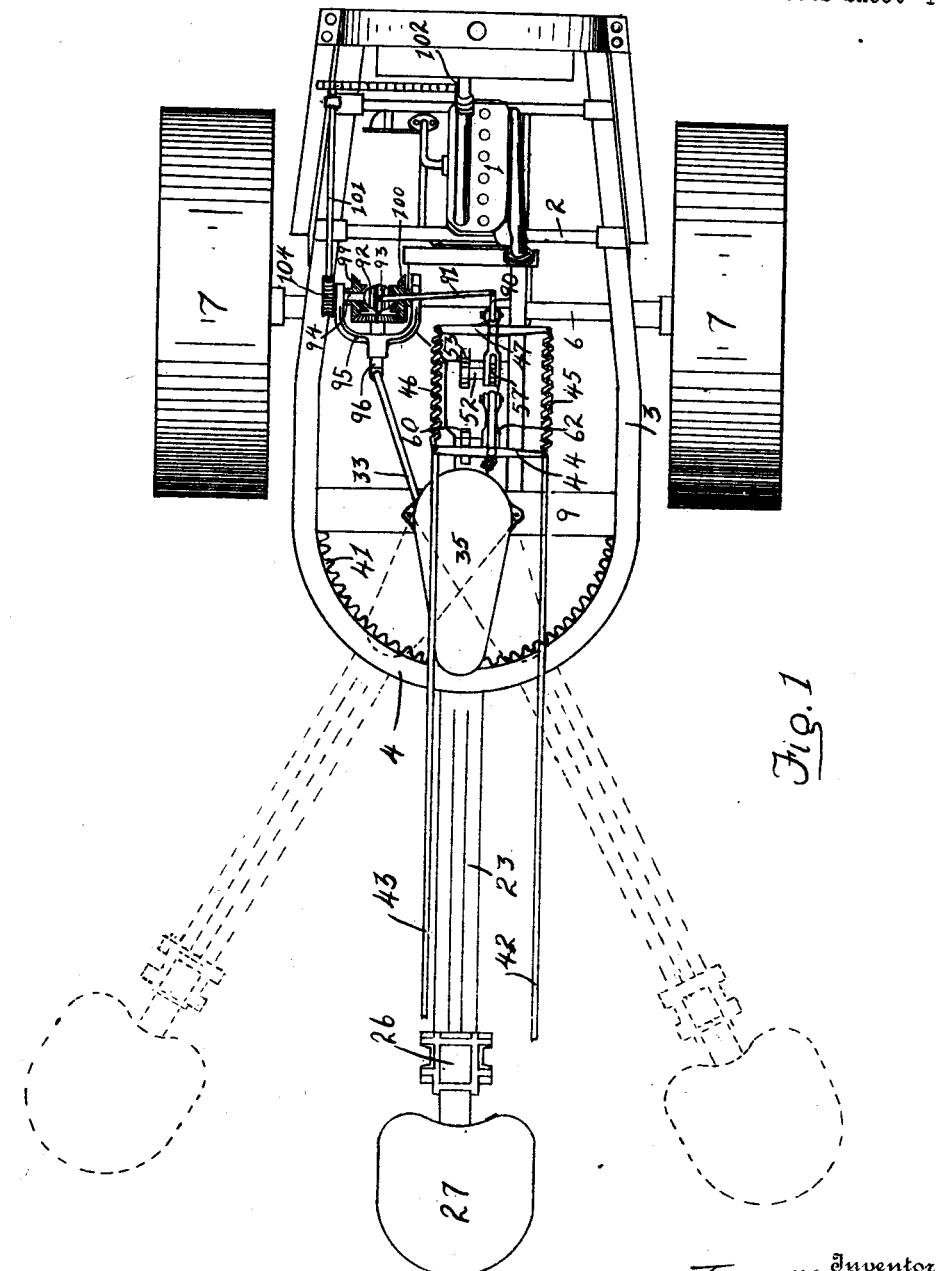
Fig. 1 is a plan view of a tractor embodying my invention.

It will be readily understood that the type of engine employed is quite immaterial, but is preferably of the internal combustion type as is shown here, which is shown at 1 and mounted on cross frames 2 resting on the main frame 3, the side members of which form half circle at the rear end 4 which is provided with rack teeth 41 utilized in steering the apparatus as is hereinafter described. This frame is mounted upon a wheel axle 6 having the wheels 7, 7 on opposite sides of the frame for driving the apparatus.

Figure 3:
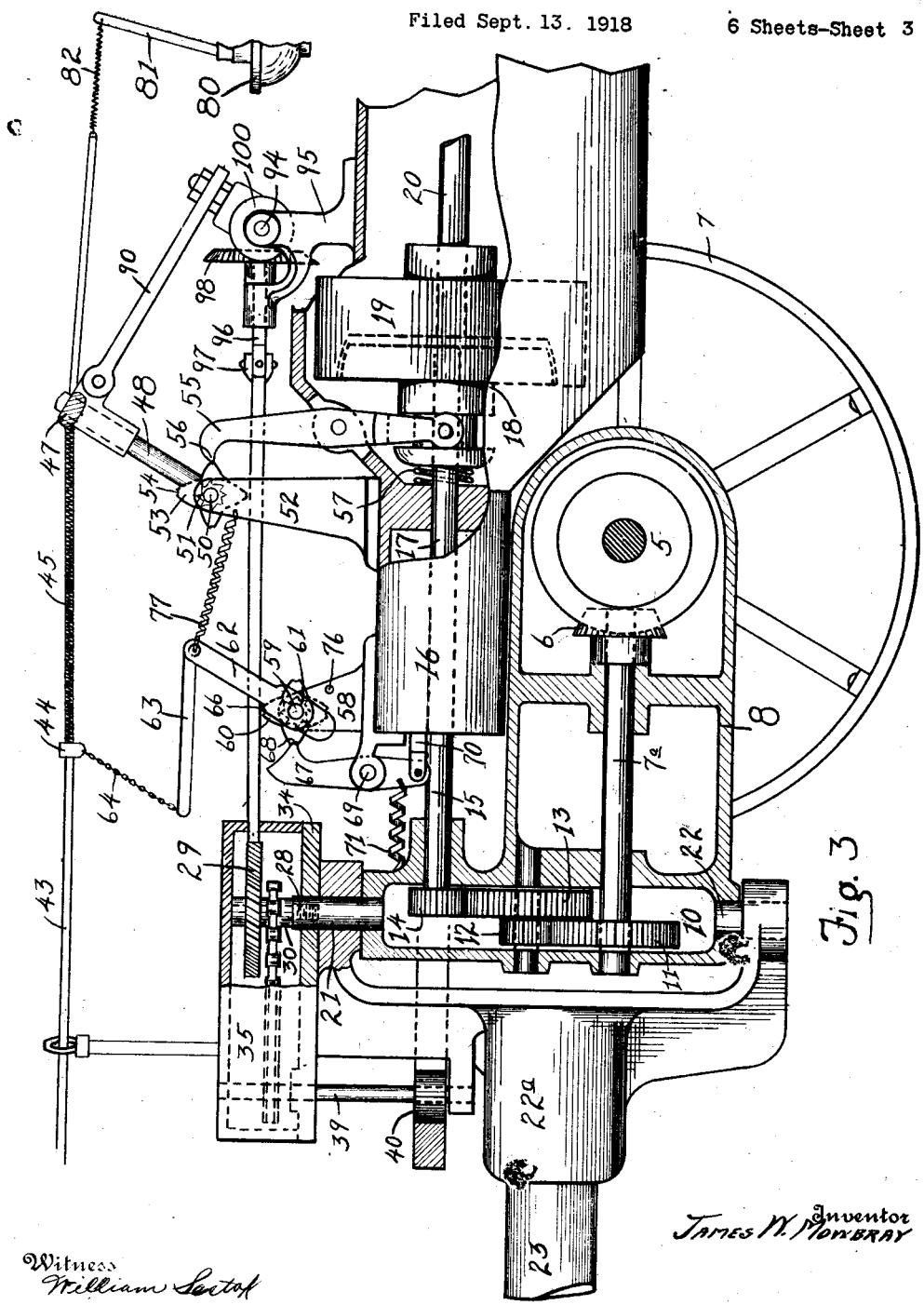
Fig. 3 is an enlarged side elevation, partly in section, showing the various controlled parts.
Figure 4:
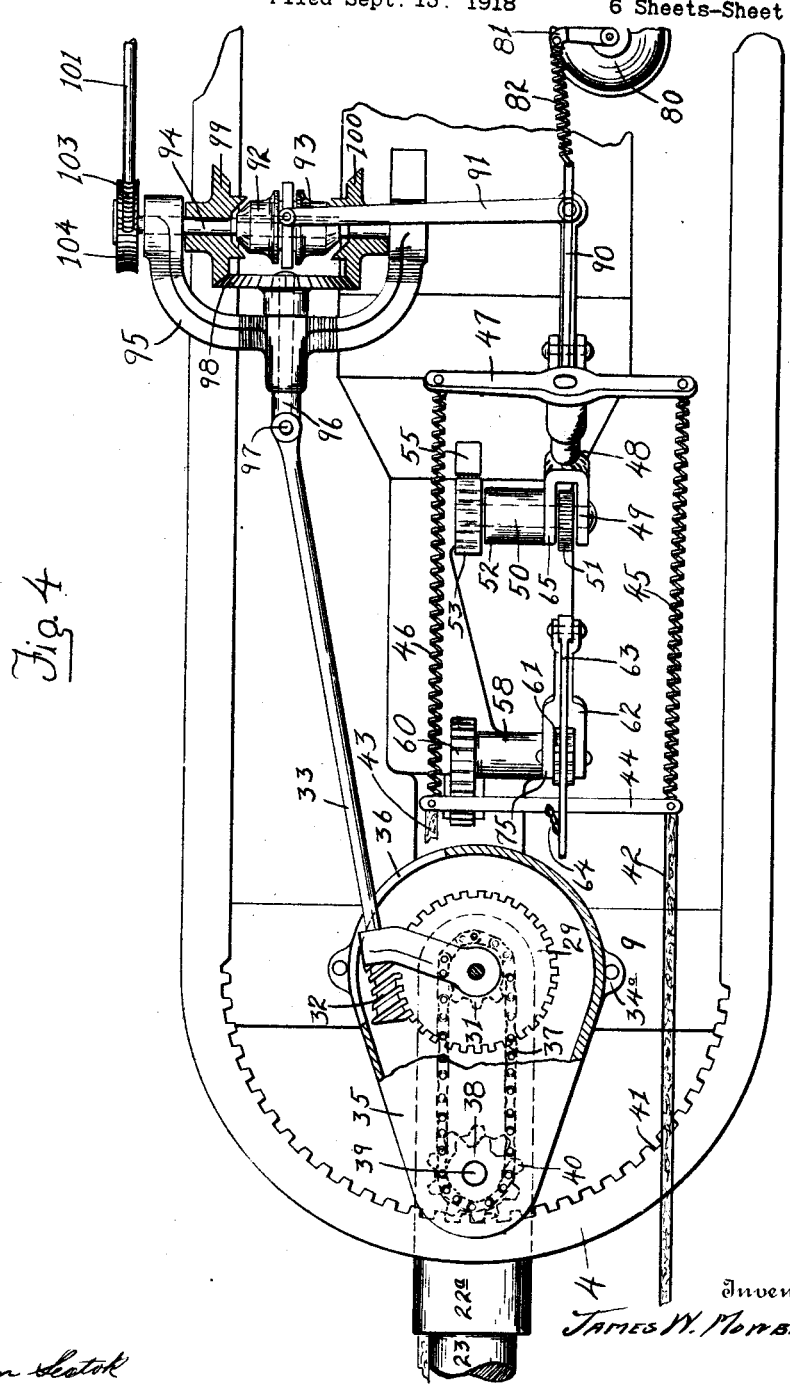
Fig. 4 is a plan view thereof.

The axle is a two-part axle and, as will be understood from the Fig. 3, a differential gear group 5 of the usual type interposed between the adjacent ends thereof driven by a bevel gear 6 mounted on a shaft 7ª carried in bearings in a casing 8 which incloses the differential gear group 5 and is supported on the frame of the machine by means of a cross member 9 shown clearly in Fig. 4, which cross member is connected with the rear of the casing 8, at which point the casing is provided with a vertical chamber 10. In this chamber is a spur gear on the shaft 7ª which meshes with a smaller gear 12 on an idler shaft on which is also secured a large gear 13 meshing with a gear 14 on a drive shaft 15. This drive shaft 15 is connected by means of transmission mechanism (not shown) in the case 16 and is operated through the usual gear train by means of a shaft 17 in alignment therewith, on the forward end of which is mounted a clutch member 18, a companion member of which is formed in the fly-wheel 19 of the internal combustion engine, which fly-wheel is connected on the crank shaft 20, a portion of which only is shown in Fig. 3. With the clutch 18 in engagement with the companion member, wheels are thus driven through the gear train described and differential gear group 5, and the operation of the clutch member and the transmission mechanism is hereinafter described.

Figure 2:
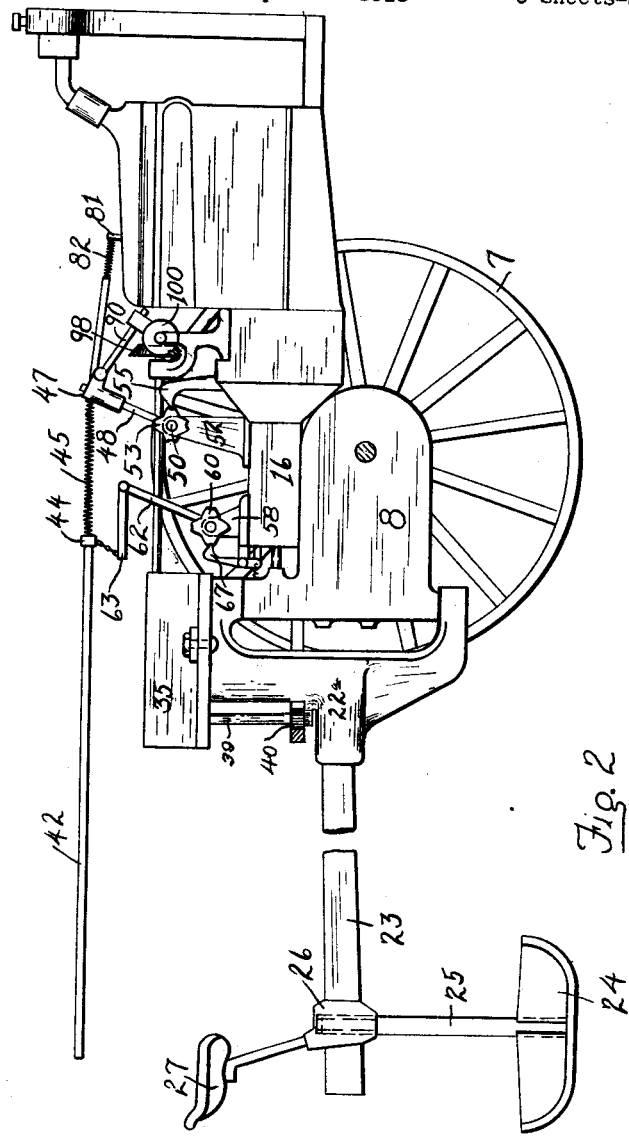
Fig. 2 is a side elevation thereof.

Pivotally mounted on the rear of the casing 8 by means of the stub shafts 21 and 22 at the upper and lower end of the vertical chamber 10 is a yoke 22ª which is provided with a rearwardly extending bar 23 as shown more particularly in Figs. 1 and 2. Ordinarily this bar is provided with a shoe 24 at the rear end thereof carried on an upright stem 25 detachably connected with a bracket or casing 26 carried on the bar and a seat 27 for the operator is also provided for use when the machine is to be driven alone. This bar or tongue 23 is the means by which the tractor is connected with other devices as for instance a wagon, the tongue of the wagon, being attached to the bar and when used with a load the seat and shoe and bracket or casting 26 may be removed from the bar and the bar attached to the apparatus or device to be drawn. When not connected with any apparatus the shoe is utilized to hold the bar in horizontal position.

The purpose of pivotally connecting the yoke with the casing or relative to the frame of the machine is to enable the machine to be guided in its movement, and this is accomplished by mechanism shown more clearly in detail in Figs. 3 and 4. As will be seen particularly in Fig. 3, the upper stub shaft 21 has a second shaft 28, indicated by dotted lines, secured at the upper end thereof, and on this extension 28 is a worm gear 29 having a sleeve 30, and on this sleeve is mounted a sprocket wheel 31 whereby the driving of the worm gear 29 drives the sprocket wheel. The worm wheel is driven by means of a worm wheel 32 on a shaft 33, which shaft is driven by the engine in a manner hereinafter described. This worm wheel and sprocket is mounted in a case having a base member 34 adapted to swing on the shaft 21 as a pivot and is provided with ears 34ª by means of which the cap member of the case 35 may be secured to the base member 34. This cap member 35 is provided with a slot 36 through which the shaft 33 projects, the slot being of sufficient length to allow the case to swing in either direction on the pivot of the shaft 21. The sprocket 31 is connected by means of a chain 37 with a similar sprocket 38 on the vertical shaft 39 which has a gear 40 on the lower end thereof meshing with the internal rack on the circular end of the main frame 4. By operation of the worm wheel 29 the shaft 39 is rotated and the gear made to traverse the rack 41 in either direction depending upon the direction of rotation of the worm wheel 29. This tends to swing the bar on its pivot, or rather the frame of the machine by reason of the bar being attached to a load of some character turns relative to the bar and thus the machine is guided in its movement, the machine being turned by the power derived from the engine that is in fact a power steering apparatus, and the drive wheels being differentially driven, as described, the machine turns with each in either direction.

As previously stated, the machine is controlled solely by a pair of lines 42 and 43. These lines are connected to a cross bar 44 and this cross bar is connected at each end respectively by means of a spring 45 and 46 with a forward cross bar 47. This cross bar 47 is pivotally mounted on a stud 48 having a bifurcated end 49, and the said ends are apertured to receive a shaft 50. On this shaft between the furcations is a ratchet wheel 51 secured to the shaft. As shown in dotted lines in Fig. 5, the stub shaft 48 at the bifurcated end is provided with a spring latch or pawl 48ª engaging the ratchet so that movement of the shaft 48 about the shaft 50 as a pivot turns the shaft 50. This shaft 50 is carried at the upper end of a bracket 52 which may be mounted in any convenient manner on the transmission case or some portion thereof as indicated in Fig. 3, and on the inner end the shaft is provided with a star wheel 53, the points of the star being notched as indicated at 54. Engaging with the star wheel is the pointed end of a lever 55 pivoted in the transmission casing as shown in Fig. 3, the lower end of which is forked to engage a groove in the hub of the clutch member 18. It will be noted that in the position the wheel 53 with the point 56 engaging at the point of one tooth of the star wheel, the clutch member 18 is held out of engagement with its companion in the fly-wheel 19. If the ratchet wheel be moved by the turning of the shaft 50 the point 56 will engage at the lowest point between the two arms or teeth of the star wheel allowing the clutch 18 to move into engagement with its companion by reason of the operation of the spring 57 on the shaft 17. Thus, by moving the stub shaft 48 having the bifurcated end, the star wheel is intermittently turned by movement backward of the stub shaft 48 from the position shown in Fig. 3 allowing the nose or point 56 to drop between two teeth and engaging the clutch member 18 with its companion thus connecting the engine with the power transmission mechanism and driving the wheels. If the shaft 48 be again rotated or turned, a succeeding point of the star wheel forces the lever to assume original position as shown in Fig. 3, and thus after movement of the stub shaft 48 and bifurcated end 49 thereon actuates the star wheel and successively engages the clutch members.

This shaft 48 is turned by pulling on the lines 42 and 43 equally. As is hereinafter shown, there is a spring utilized to turn the shaft 48 about the shaft 50 on release of pressure on the lines 42 and 43. It will thus be seen that with the engine in operation and the parts in the normal position shown in Fig. 3, simply pulling up on the two lines 42 and 43 will place the clutch 18 into engagement with its companion 19, whereupon the power will be transmitted to the driving wheel. Mounted at the rear of the transmission casing 16 is a bracket 58 having a shaft 59 mounted therein similar in all respects to the shaft 50. This shaft is provided also with a star wheel 60 at one end and a ratchet 61 at the other, which ratchet is engaged by the bifurcated end of the shaft or lever 62 in the same manner as with the stub shaft or lever 48. This lever is connected by means of a pivoted bar 63 with a chain 64 to the crossbar 44. This connection allows some backward movement of the bar 44 prior to the time it will become taut and turn the lever 62 about the shaft 59 and operate the ratchet thereon so that in first pulling on the lines the lever or shaft 48 is turned to the limit of its movement, and this movement of the shaft or lever 48 may be limited in various ways as for instance by making one end of the furcations longer than the other, as is indicated at 65, which would engage with a pin on the supporting bracket 52. When the shaft 48 has thus been stopped in its movement, the springs allow the lines to still be drawn backward and operate the lever 62. The star wheel 60 has the points thereof notched at 66 in the same manner as the star wheel 53 and a lever 67 has a nose or point 68 adapted to engage the said notches or to engage the teeth at the base thereof as is indicated in Figs. 7 and 8. This lever 67 is pivoted at 69 to the bracket, and the lower end has pivotally connected therewith a bar 70. Although not so shown, it is to be understood that the bar 70 is connected with a sliding gear within the transmission case 16 and with the parts shown the gear is in forward driving position. When the star wheel 60 has been turned, however, so that the nose 68 drops between the teeth, which is occasioned by the action of the spring 71 on the bar 70, the reverse gear is drawn to operative position in the transmission mechanism and reverses the direction of movement of the shaft 15 and consequently of shaft 7ª and driving wheels operatively connected therewith. This lever 62 at the bifurcated end, as indicated in Fig. 6, is provided with an elongated arm 75 which engages the pin 76 as with the lever or shaft 48 heretofore described which limits its backward movement by means of the lines. The lever 62 upon release of the lines, is moved forward by means of the spring 77. Upon forward or idle movement of both the levers 48 and 62 by the respective springs, the shafts 50 and 59 are held from being turned with the levers as the shafts are sufficiently restrained by reason of the yieldable engagement of the levers 55 and 67 with the star wheels for the respective shafts. Thus, if the lever 48 be moved to turn the star wheel and the lines released, the lever 48 turns backward to position to be again operated, leaving the star wheel and a lever engaging therewith in its set position thus requiring a successive pull on the lines to change the relationship of the parts.

It is to be noted that, by succeeding operations of the lever 48, the star wheel moves the lever 55 to cause the clutch 18 to move alternately to engagement with and disengagement from its companion in the fly wheel 19. It is also to be understood that the successive movements of the lever 62 by the lines alternately sets the shift gear for reverse and forward driving of the vehicle. In the position of the parts shown in Fig. 3, the clutch 18 is disengaged and the shift gear is in reverse position. Release of the lines and a succeeding short pull will release the lever 55 and engage the clutch and thereby cause backward movement of the vehicle. If it is then desired to move forward, it will be necessary to shift the gear, at which time it is also necessary that the clutch member be disengaged. To accomplish this, the operator first draws the lever 48 backward which disengages the clutch and while the lever 48 is drawn backward to effect this result, the lines are continued to be pulled until the lever 62 is actuated which causes the star wheel 60 to be moved permitting the point of the lever 67 to engage between the teeth thereof thereby positioning the shift gear in the forward driving position. Thereupon, the lines may be released permitting the levers 62 and 48 to return to normal position by their respective springs. The lever 48 is then again actuated to permit the point 56 of the lever 55 to drop between the points of the star wheel 53 thus permitting engagement of the clutch. If it is desired to stop the machine, a pull on the lines brings the succeeding point of the star wheel 53 to engagement with the point 56 of the lever 55 thereby withdrawing the clutch. Thus, the machine may be started or stopped by a pull on both lines, and it is only after the clutch is disengaged as above stated, that the shift gear may be moved by a further continued pull on the lines. The shift gear is not here shown in detail, it being of a familiar and well known character, but it is to be understood that various types of gear shift devices may be used capable of being operated by a star wheel after the manner herein disclosed.

As with usual internal combustion engines, a carburetor 80 is provided having a throttle valve controlled by a lever 81 of any approved form. This lever may be connected by means of a spring 82 with the shaft or lever 48 so that on advancing the said lever to start the engine the throttle is opened and the engine speeded up, and upon release of the lines preparatory to withdrawing the clutch, the throttle is closed. The closing operation of the throttle is performed by means of a spring (not here shown) as is usual with ordinary construction now commonly known. It is thus to be seen that by simply pulling up on the lines the throttle is opened, the engine speeded up, the transmission mechanism connected therewith to drive the machine forward or in reverse direction as may be decided upon. By simply maintaining the pull upon the lines, the throttle is maintained open and the engine operating at full speed. If it be desired to lessen the engine's speed a slight release on the lines will operate the throttle to lessen the engine speed.

The machine is also guided by the lines. If it be desired to turn to the right or to the left the corresponding line is pulled upon. This turns the bar 47 on the shaft 48 turning the lever 47 on its pivot, drawing the arm 90 to the right or left as the case may be, which arm is pivoted to the bar to swing in a vertical plane and is moved in a horizontal plane by reason of rotation of the arm as stated. This arm 90 has an apertured end to which is connected a shifting lever 91 of the clutch mechanism of which there are two similar members 92 and 93 slidable on a shaft 94, which shaft is carried in a yoke 95 supported on top of the engine as shown clearly in Fig. 3. This yoke supports a horizontal shaft 96 positioned at a right angle to the shaft 94 and this shaft 96 is connected by means of a universal joint 97 with the shaft 33 on which is positioned the worm 32 meshing with the worm wheel 29. On the inner end of the shaft 96 is a bevel gear 98 continuously in mesh on opposite sides with a bevel gear 99 and 100. Both these gears have a coned face corresponding to the cone faces of the clutch members 92 and 93 forming companion clutch members respectively therewith. These gears 99 and 100 are loose on the shaft and on movement of the lever 90 to throw the clutch 92 in engagement with the companion gear 99, the said gear is made to rotate the shaft 94 and to rotate the bevel gear 98 in one direction whereas movement of the gear clutch face into engagement with the companion gear 100 rotates the gear 98 in the opposite direction and thus the gear 40 rotates in one direction or the other and is made to traverse the rack 41 to guide the machine in a manner heretofore described. The shaft 94 may be driven in any convenient manner from some point on the engine preferably by means of the shaft 101 positioned parallel with the framework of the machine properly supported relative thereto. At the forward end is provided a sprocket wheel driven by means of a sprocket wheel 102 driven from the forward end of the engine crank shaft. At the opposite end of the shaft is a worm 103 meshing with a worm wheel 104 on the shaft 94 by means of which the same is continuously driven. By this means the machine may be guided to the right or left simply by pulling upon the corresponding line. Inasmuch as the pull upon one line does not actuate the lever 48 or 62 on their pivots the position of the said levers is not altered and, therefore, the machine may be guided without altering the relationship of the parts controlled by the said levers. The operation of the gear 40 in the rack 41 turns the body of the vehicle relative to the bar 23 in the relationship shown by dotted lines in Fig. 1 although, instead of the bar being turned as would be naturally understood from the drawing, the machine is turned relative to the bar as the bar is usually connected with a load and in fact at all times by reason of the shoe which rides on the ground surface, if the device be unconnected with a load, sufficient resistance exists to prevent side movement in making the desired turns of the vehicle.

Preferably to prevent too sudden engagement of the clutch member 18 with its companion in the fly wheel 19 of the engine, the lever 55 is provided with a dash pot 155. The cylinder is filled with oil and a piston is reciprocable thereon. The piston has a small aperture 157 therethrough through which oil may pass slowly on movement of the piston. The piston is also provided with a channel 158 closable by a ball valve 159. On movement of the piston toward the bottom of the cylinder the ball valve closes preventing rapid movement of the piston in one direction and opening and allowing rapid movement in the other direction. The piston is provided with a stem 160 having a bifurcated end engaging about the lever 55 as shown in Fig. 5. A pin 161 is inserted through this bifurcated end and through the slot 162 in the lever. This slot is provided to allow the stem to move in a straight line while the lever turns upon its pivot.

Figure 9:
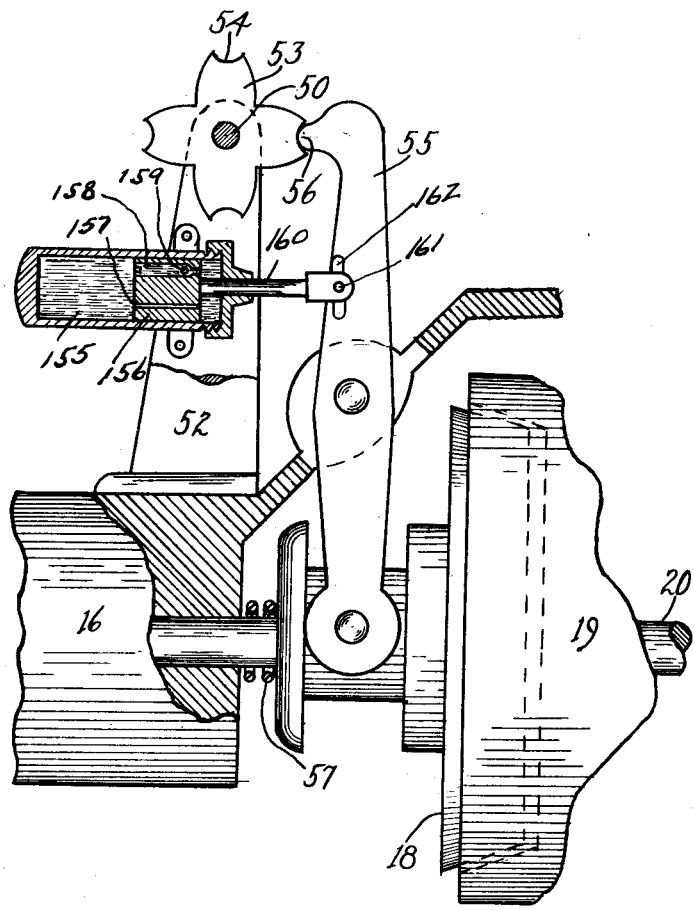
Fig. 9 is a detail of part of the clutch mechanism.

In the position of the parts shown in Fig. 9 the lever is in the position when the clutch 18 is withdrawn and the engine disconnected with the driven parts. Upon turning the star wheel 53 to allow the point 56 of the lever to engage between the two arms of the star wheel (which movement is caused by the spring 57) the dash pot device prevents sudden movement of the lever and the clutch 18 moves into engagement gradually and without jar which would tend to stall the motor. The dash pot is therefore a safety device and automatically cares for gradual engagement of the clutch 18 on operation of the lines to start the vehicle. With the clutch in engagement the star wheel may be operated to the position shown in Fig. 9 and this movement is practically unrestricted by reason of use of the ball valve which opens on movement of the piston 156 to the right of the figure.

From the foregoing description it becomes evident that the operation of the motor vehicle is controlled solely by the two lines and that the vehicle may be driven from a drawn load as easily and efficiently as with other types of vehicles in which the driver actuates the various control levers directly by hand to set the parts in necessary relation to produce the desired result in operation.

It is furthermore evident that the tractor herein described is simple in construction comparatively inexpensive and that the device may be operated by one practically unfamiliar with the character of mechanism described by simply learning to manipulate the lines in a manner quite analogous to the manipulation of lines in driving a horse. In fact the main purpose of the method of control herein described is to enable the device to be controlled from a distance by persons having little knowledge of the mechanism controlled thereby.

Having thus fully described my invention and its mode of operation what I claim and desire to secure by Letters Patent of the United States is—

1. In a tractor, a power plant and driving mechanism therefor, a clutch interposed between the power plant and driving mechanism for connecting or disconnecting the same, control mechanism for operating the clutch comprising a line or cable for operating the mechanism from a distance, a lever for actuating the clutch to which the line is connected, a spring adapted to cause engagement of the clutch, a dash pot restricting movement of the lever by the spring whereby gradual engagement of the clutch by the spring is automatically produced, and means whereby succeeding pulls on the line alternately moves the lever to disengage the clutch and releases it to action by the spring.

2. In a tractor, a power plant and driving mechanism therefor, a clutch interposed between the power plant and driving mechanism for connecting or disconnecting the same, a speed control for advancing or retarding the speed of operation of the power plant, and control mechanism for operating the clutch comprising a line for actuating the mechanism from a distance, means whereby succeeding pulls on the line alternately engages and disengages the clutch, and a connection between the line and speed control mechanism whereby a pull on the line increases the speed of the power plant and a release of the line decreases the speed of operation of the power plant.

3. In a tractor, a power plant and power transmission mechanism, driving mechanism operatively connected with the transmission mechanism, a clutch interposed between the power plant and transmission mechanism for connecting or disconnecting the same, a control mechanism for operating the clutch comprising a line, a lever controlling the clutch to which the line is connected, means whereby succeeding pulls on the line actuates the lever to alternately engage and disengage the clutch, the transmission mechanism being normally adapted to operate the driving mechanism to drive the machine in a forward direction, a reverse gear forming part of the transmission mechanism, a lever for moving the reverse gear into and out of operative relation with the transmission mechanism, a spring for moving the lever in one direction, means connecting the lever with the line in a manner to allow the line to be pulled to first operate the clutch control lever and thereafter by continued pulling of the line actuate the reverse gear lever to engage or disengage the reverse gear.

4. In a tractor, a power plant, power transmission mechanism, driving mechanism operatively connected with the transmission mechanism, a clutch interposed between the power plant and transmission mechanism for connecting or disconnecting the same, a lever controlling operation of the clutch, a line having a yieldable connection with the said lever, said lever being limited in its movement whereby on pulling the line and the lever reaching the limit of its movement, said line may be continued in movement due to the yieldable means, reverse gear adapted to be brought into and out of operative relation with the transmission mechanism, a lever controlling operation of the reverse gear, said lever having connection with the said line, there being lost motion in the said connection whereby the clutch controlling lever may first be brought to its limited position by pulling on the line and further movement of the line thereafter actuate the reverse gear lever.

5. In a tractor, a power plant and driving mechanism therefor, a steering means adapted to be actuated by the power plant, a clutch interposed between the power plant and driving mechanism for connecting or disconnecting the same, a lever controlling actuation of the clutch to alternately engage and disengage the same, a member having arms rotatably mounted on the said lever, a line attached to each arm, whereby an equal pull on both lines actuates the clutch control lever and a pull upon one line or the other turns the rotatable member, an arm connected with the said rotatable member adapted upon turning in one direction to apply the power of the power plant to steer the machine in one direction and upon the rotatable member being turned in the opposite direction to apply the power to turn the machine in the opposite direction.

6. In a tractor, a power plant and driving mechanism therefor, steering means normally disconnected with and adapted to be actuated by the power plant, means for applying the power to steer the vehicle in one direction or the other, a clutch interposed between the power plant and driving mechanism, a pivoted lever adapted upon successive movements to alternately cause engagement and disengagement of the clutch, a member rotatably mounted on the lever, a pair of lines connected to opposite sides of said member whereby pulling upon one line turns the member and pulling upon both lines turns the lever on its pivot, and means whereby the turning of the said member in one direction or the other applies the power to correspondingly steer the machine.

7. In a tractor, a power plant, power transmission mechanism, driving mechanism connected with the transmission mechanism, a lever limited in movement and adapted upon succeeding actuations to alternately cause engagement and disengagement of the clutch, steering means adapted to be actuated by the power plant and being normally disconnected therewith, a member rotatably mounted on the lever, means whereby the turning of the member in one direction or the other applies the power to correspondingly actuate the steering means, a pair of lines having a yieldable connection with the said rotatable element whereby upon pulling both lines the lever may be turned or upon pulling either line the power is correspondingly applied to the steering means, a reverse gear in the transmission mechanism, a lever controlling operation of the reverse gear, a slack connection between the said reverse gear lever and the said lines, the slack allowing the lines to be drawn taut to actuate the clutch controlling lever and thereafter by continued movement allowable by the yieldable connection of the lines, actuate the reverse gear lever.

8. In a tractor, an internal combustion engine providing a power plant, driving mechanism for the tractor, steering means adapted to be actuated by the engine, a clutch interposed between the power plant and driving mechanism, a lever controlling actuation of the clutch to alternately engage and disengage the same by successive actuations thereof, a member having arms rotatably mounted on the lever, a line attached to each arm, the construction being such that an equal pull on both lines actuates the lever and a pull upon either line turns the rotatable member, said power plant being normally disconnected from the steering means, an arm connected with the rotatable member adapted upon turning thereof in one direction or the other to apply the power of the power plant to correspondingly steer the machine, a throttle for controlling the speed of the engine, said throttle being yieldably connected with the clutch control lever whereby upon pulling of the lines the throttle may be opened and upon release of the lines the throttle may be closed.

9. In a tractor, a frame-work, a power plant, a pair of driving wheels supporting the frame-work, power transmission mechanism connected with the driving wheels, a clutch interposed between the power plant and transmission mechanism for connecting and disconnecting the same, a gear segment at the rear of the frame-work, a draft appliance having a yoke pivotally mounted on a vertical axis, the axis of the yoke and axis of the segment coinciding, a gear meshing with the segment, means for rotatably supporting the gear in fixed relation with the yoke, a worm wheel rotatably mounted on an axis in alignment with the axis of the yoke, means whereby rotation of the worm wheel rotates the said gear, a worm for operating the worm wheel, a gear for rotating the worm, means for applying the power to rotate the said gear in one direction or the other, a pivoted lever controlling actuation of the clutch to alternately engage and disengage the same by successive movement on its pivot, a rotatable element on the said lever having an arm engaging the power applying means, the arrangement being such that turning the element in one direction or the other correspondingly applies the power to actuate the said gear, a pair of lines connected with the said rotatable element by means of which the pivoted lever may be turned by pulling both lines and the rotatable element may be turned by excess strain on either line.

10. In a tractor, a framework, a power plant, a pair of differentially operable driving wheels supporting the power plant and framework, a clutch device for connecting and disconnecting the power plant and driving wheels, a gear segment at the rear of the framework, a draft bar pivotally mounted to swing on a vertical axis coinciding with the axis of the segment, a gear rotatably supported in fixed relation with the draft bar and meshing with the segment, a power steering element, and a control device including a pair of lines, the said control device including means whereby pulling on either line correspondingly applies the power to the steering element, and means whereby successive pulls on both lines simultaneously causes engagement and disengagement of the clutch.

11. In a tractor, the combination with a power element, a speed changing power transmission device and a steering element, of a control means therefor comprising a pair of lines, a control member to which the lines are connected, means whereby a pull on either line independently correspondingly actuates the steering element, means whereby successive pulls on both lines simultaneously alternately connects and disconnects the power element and the transmission device, and means whereby a pull on both lines simultaneously to an extent greater than is required to connect or disconnect the power element effects change in the speed changing power transmission element.

12. In a tractor, the combination with a power element, a speed changing power transmission device, a clutch therebetween and the steering element, of control means therefor comprising two lines, mechanism connected therewith adapted by a pull upon either line to affect the steering, means adapted by successive independent pulls upon both lines to alternately connect and disconnect the clutch, and mechanism independently connected with the lines adapted to effect a change in the speed changing power transmission element by a pull on both lines to an extent greater than is required to disconnect the clutch.

In testimony whereof, I sign this specification.

JAMES W. MOWBRAY.